United States Patent
Hoff et al.

(10) Patent No.: US 12,270,447 B2
(45) Date of Patent: Apr. 8, 2025

(54) VIBRATION DAMPER WITH INTERMEDIATE FLANGE TRAVEL STOP AND TORQUE CONVERTER WITH VIBRATION DAMPER HAVING INTERMEDIATE FLANGE TRAVEL STOP

(71) Applicant: Schaeffler Technologies AG & Co. KG, Herzogenaurach (DE)

(72) Inventors: Austin Hoff, New Franklin, OH (US); David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 703 days.

(21) Appl. No.: 17/529,701

(22) Filed: Nov. 18, 2021

(65) Prior Publication Data
US 2023/0151873 A1 May 18, 2023

(51) Int. Cl.
*F16F 15/121* (2006.01)

(52) U.S. Cl.
CPC .............................. *F16F 15/1217* (2013.01)

(58) Field of Classification Search
CPC .. F16F 15/1207; F16F 15/1217; F16F 15/123; F16F 15/1295; F16F 15/134; F16F 15/1338; F16H 2045/0221; F16H 2045/0252
USPC ........................................................ 464/68.1
See application file for complete search history.

(56) References Cited

U.S. PATENT DOCUMENTS

| | | | | |
|---|---|---|---|---|
| 3,938,635 A | * | 2/1976 | Davies | F16F 15/129 192/213.31 |
| 4,569,430 A | * | 2/1986 | Raab | F16F 15/129 464/68.41 |
| 5,205,389 A | * | 4/1993 | Raab | F16F 15/129 464/68.41 |
| 5,401,213 A | * | 3/1995 | Muchmore | F16F 15/129 464/68.41 |
| 5,673,778 A | * | 10/1997 | Ament | F16F 15/129 464/68.41 |
| 5,680,918 A | * | 10/1997 | Reik | F16F 15/1397 464/68.4 |

(Continued)

FOREIGN PATENT DOCUMENTS

| | | | | |
|---|---|---|---|---|
| DE | 4314856 A1 | * | 11/1993 | ........ F16F 15/1207 |
| DE | 102018131319 B3 | * | 2/2020 | ........ F16F 15/1217 |

(Continued)

*Primary Examiner* — Josh Skroupa
(74) *Attorney, Agent, or Firm* — Volpe Koenig

(57) ABSTRACT

A torque converter, including: a cover; an impeller including an impeller shell connected to the cover and at least one impeller blade; a turbine in fluid communication with the impeller and including a turbine shell and at least one turbine blade; stator including at least one stator blade; and a vibration damper including a first cover plate, a second cover plate non-rotatably connected to the first cover plate, an intermediate flange axially disposed between the first cover plate and the second cover plate, at least one spring directly engaged with the first cover plate, the second cover plate, and the intermediate flange, and a resilient element directly engaged with the first cover plate and the intermediate flange and urging the intermediate flange in an axial direction, parallel to an axis of rotation of the torque converter, away from the first cover plate and into contact with the second cover plate.

20 Claims, 10 Drawing Sheets

(56) References Cited

U.S. PATENT DOCUMENTS

| | | | |
|---|---|---|---|
| 5,826,688 A * | 10/1998 | Arhab | F16F 15/123 |
| | | | 192/3.29 |
| 6,299,540 B1 * | 10/2001 | Ament | F16F 15/1295 |
| | | | 464/68.41 |
| 7,229,357 B2 * | 6/2007 | Fukushima | F16F 15/1343 |
| | | | 464/68.1 |
| 8,403,762 B2 * | 3/2013 | Steinberger | F16F 15/13492 |
| | | | 464/68.1 |
| 8,465,372 B2 * | 6/2013 | Saeki | F16F 15/1297 |
| | | | 464/68.4 |
| 8,746,424 B2 | 6/2014 | Kneidel | |
| 8,763,775 B2 | 7/2014 | Vanni et al. | |
| 9,719,588 B2 * | 8/2017 | Carrier | F16H 45/02 |
| 9,732,835 B2 * | 8/2017 | Kawahara | F16F 15/12353 |
| 9,939,057 B2 * | 4/2018 | Lee | F16F 15/123 |
| 10,030,740 B2 * | 7/2018 | Tomiyama | F16F 15/134 |
| 10,233,978 B2 * | 3/2019 | Matsuda | F16H 45/02 |
| 10,393,223 B2 * | 8/2019 | Hertel | F16F 15/1421 |
| 10,563,723 B2 * | 2/2020 | Satyaseelan | F16F 15/13484 |
| 10,598,229 B2 * | 3/2020 | Hennebelle | F16F 15/12353 |
| 10,683,908 B2 * | 6/2020 | Watanabe | F16F 15/1234 |
| 2010/0248846 A1 * | 9/2010 | Saeki | F16F 15/1297 |
| | | | 464/99 |
| 2015/0219196 A1 * | 8/2015 | Heck | F16F 15/1207 |
| | | | 464/170 |
| 2017/0108076 A1 * | 4/2017 | Watanabe | F16F 15/1202 |
| 2018/0163837 A1 * | 6/2018 | Sato | F16H 45/02 |

FOREIGN PATENT DOCUMENTS

| | | | | |
|---|---|---|---|---|
| FR | 2361574 A1 * | 3/1978 | | F16F 15/123 |
| GB | 1438662 A * | 6/1976 | | F16F 15/123 |
| GB | 1492982 A * | 11/1977 | | F16F 15/1295 |
| WO | WO-2016132886 A1 * | 8/2016 | | F16F 15/123 |

* cited by examiner

VIBRATION DAMPER WITH INTERMEDIATE FLANGE TRAVEL STOP AND TORQUE CONVERTER WITH VIBRATION DAMPER HAVING INTERMEDIATE FLANGE TRAVEL STOP

TECHNICAL FIELD

The present disclosure relates to a vibration damper using an intermediate damper as a travel stop and a torque converter including the vibration damper using an intermediate damper as a travel stop

BACKGROUND

Known vibration dampers use a rivet, connecting cover plates of the vibration damper, as a travel stop.

SUMMARY

According to aspects illustrated herein, there is provided a vibration damper for a torque converter, including: a first cover plate arranged to receive, from a lock-up clutch, a first rotational torque in a first rotational direction; a second cover plate non-rotatably connected to the first cover plate and including a plurality of radially outwardly extending protrusions defining a first plurality of indentations; an intermediate flange axially disposed between the first cover plate and the second cover plate and including a plurality of axially extending protrusions disposed in the first plurality of indentations; and at least one spring directly engaged with the first cover plate, the second cover plate, and the intermediate flange.

According to aspects illustrated herein, there is provided a vibration damper for a torque converter, including: a first cover plate; a second cover plate non-rotatably connected to the first cover plate; an intermediate flange axially disposed between the first cover plate and the second cover plate; at least one spring directly engaged with the first cover plate, the second cover plate, and the intermediate flange; and a resilient element directly engaged with the first cover plate and the intermediate flange and urging the intermediate flange in a first axial direction, parallel to an axis of rotation of the torque converter, away from the first cover plate and into contact with the second cover plate.

According to aspects illustrated herein, there is provided a torque converter, including: a cover arranged to receive a first rotational torque in a first rotational direction; an impeller including an impeller shell connected to the cover and at least one impeller blade; a turbine in fluid communication with the impeller and including a turbine shell and at least one turbine blade; stator including at least one stator blade axially disposed between the turbine and the impeller; and a vibration damper including a first cover plate, a second cover plate non-rotatably connected to the first cover plate, an intermediate flange axially disposed between the first cover plate and the second cover plate, at least one spring directly engaged with the first cover plate, the second cover plate, and the intermediate flange, and a resilient element directly engaged with the first cover plate and the intermediate flange and urging the intermediate flange in a first axial direction, parallel to an axis of rotation of the torque converter, away from the first cover plate and into contact with the second cover plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
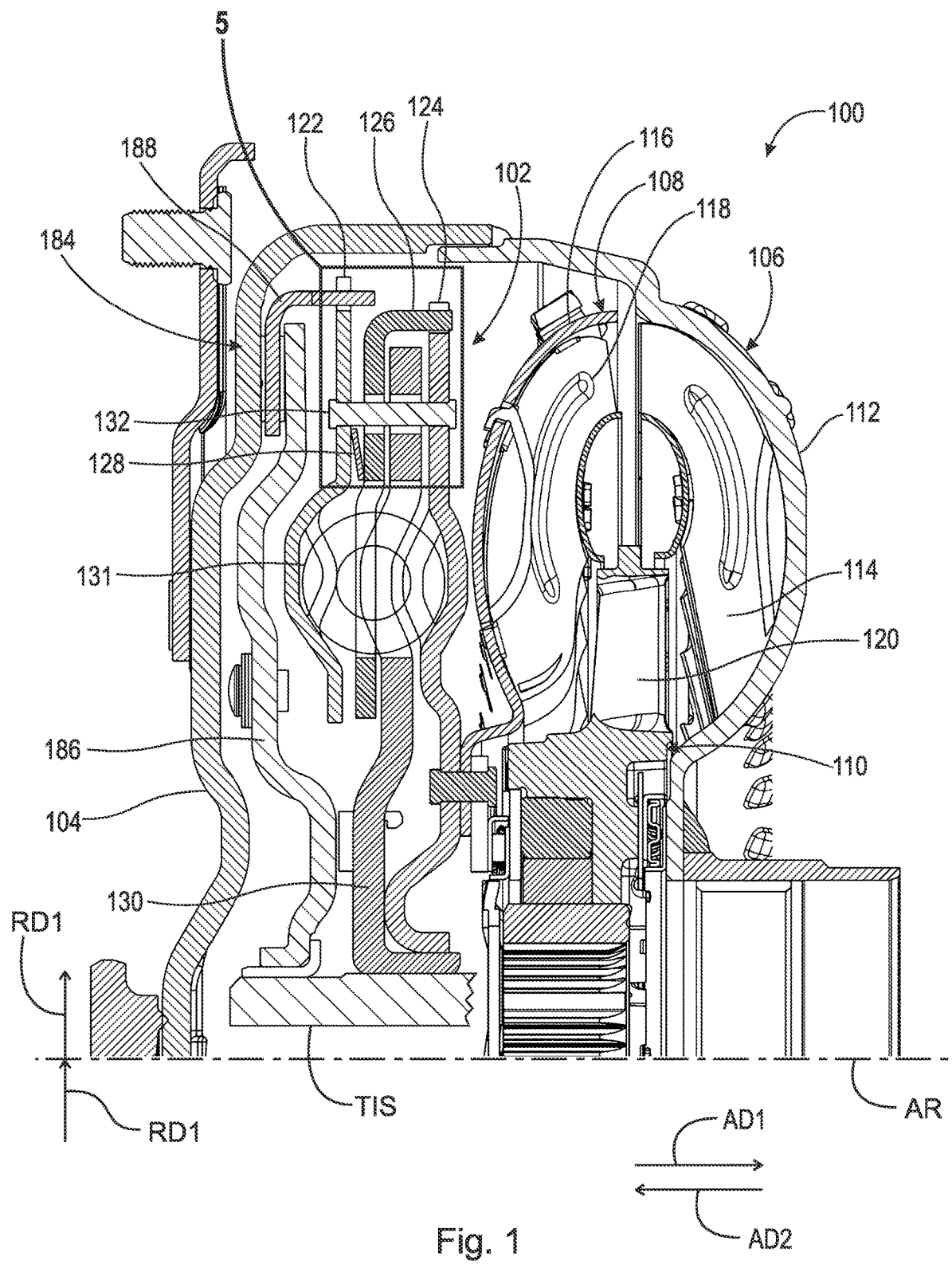
FIG. 1 is a partial cross-sectional view of an example torque converter with a vibration damper having an intermediate flange travel stop.

FIG. 1 is a partial cross-sectional view of example torque converter 100 with vibration damper 102 having intermediate flange travel stop.

Figure 2:
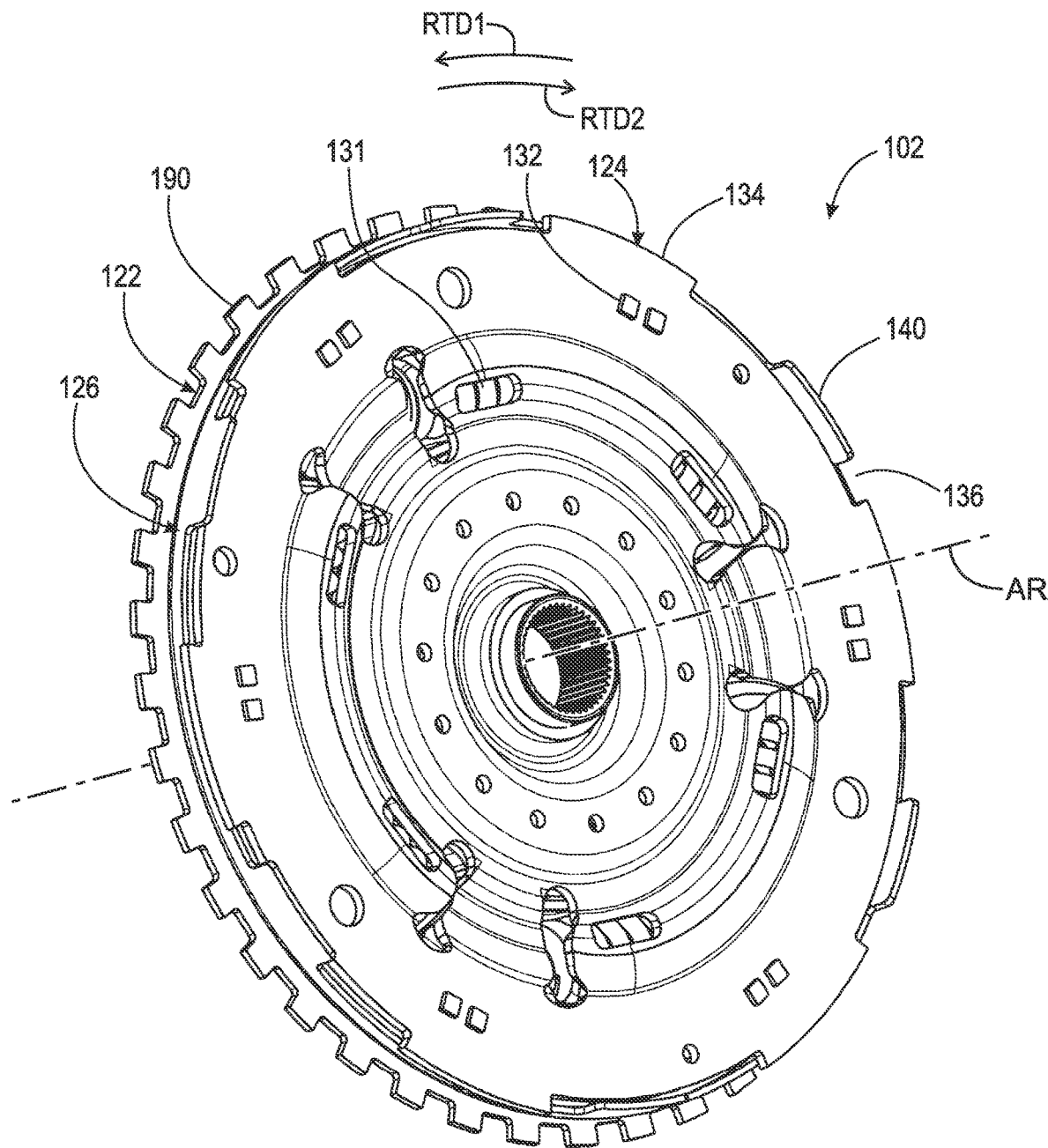
FIG. 2 is a back isometric view of the vibration damper shown FIG. 1.

FIG. 2 is a back isometric view of vibration damper 100 shown FIG. 1. The following should be viewed in light of FIGS. 1 and 2. Torque converter 100 includes: vibration damper 102; cover 104; impeller 106; turbine 108; and stator 110. Impeller 106 includes impeller shell 112 connected to cover 104, and at least one impeller blade 114. Turbine 108 is in fluid communication with impeller 106 and includes turbine shell 116 and at least one turbine blade 118. Stator 110 includes at least one stator blade 120 axially disposed between turbine 108 and impeller 106.

Figure 3:
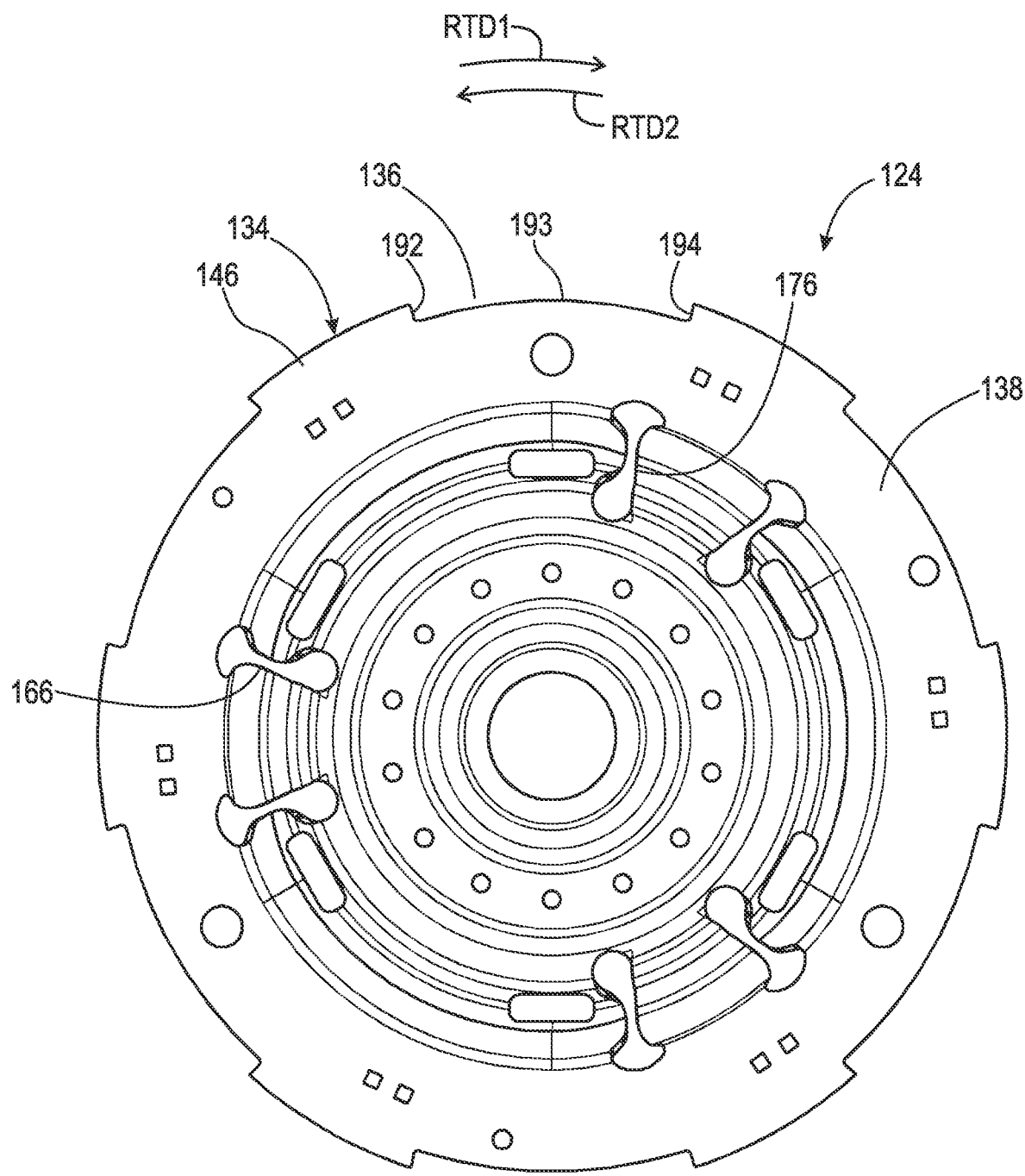
FIG. 3 is a front view of a cover plate shown in FIG. 1.

FIG. 3 is a front view of a cover plate shown in FIG. 1.

Figure 4:
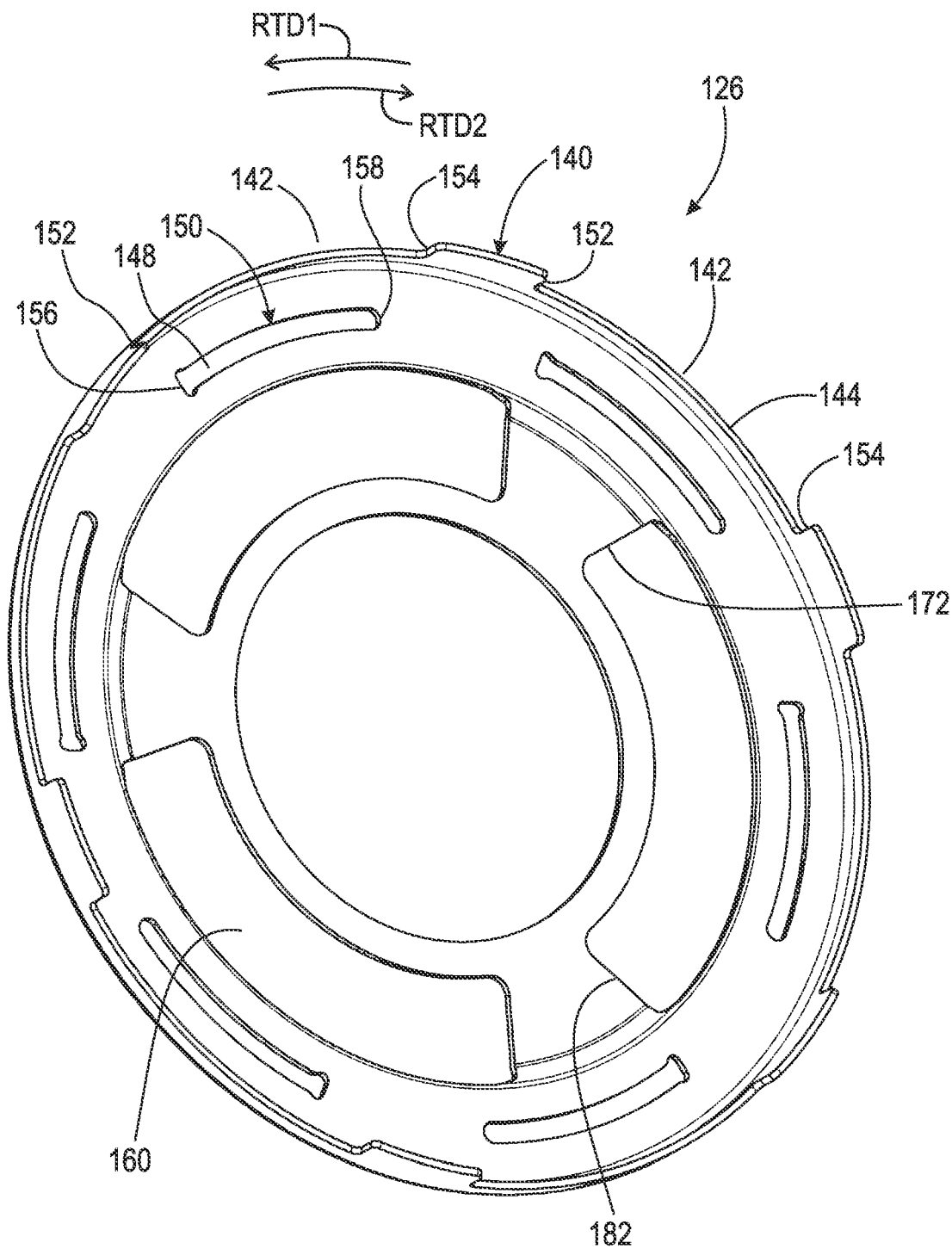
FIG. 4 is a back isometric view of an intermediate flange shown in FIG. 1.

FIG. 4 is a back isometric view of an intermediate flange shown in FIG. 1.

Figure 5:
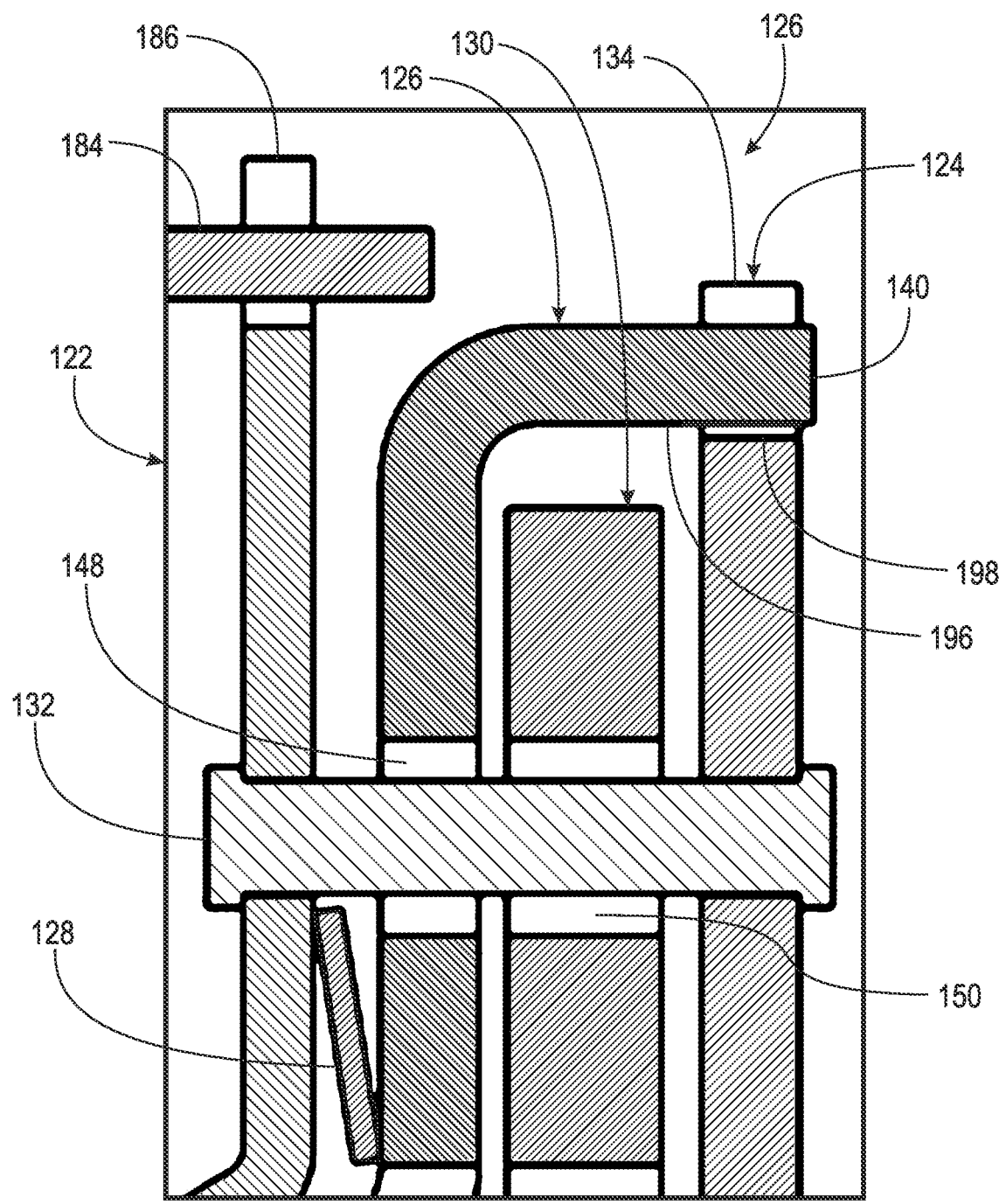
FIG. 5 is a detail of area 6 in FIG. 1.

FIG. 5 is a detail of area 6 in FIG. 1. The following should be viewed in light of FIG. 1 through 5. Vibration damper 102 includes: cover plate 122; cover plate 124; intermediate flange 126; resilient element 128; output flange 130 arranged to non-rotatable connect to transmission input shaft TIS, and springs 131 directly engaged with cover plate 122, cover plate 124, intermediate flange 126, and output flange 130. Resilient element 128 can be any suitable resilient element known in the art, including but not limited to a Belleview washer or diaphragm spring. Resilient element 128 is directly engaged with cover plate 122 and intermediate flange 126 and urges intermediate flange 126 in axial direction AD1, parallel to axis of rotation AR of torque converter 100, away from cover plate 122 and into contact with plate 124.

By one component "directly engaged with" another component, we mean that the components are in direct contact, or that the components are each in direct contact with one or more ancillary intermediate parts, for example, a cap fixed to an end of a spring, such that the components and the ancillary parts are mechanically solid at the points of contact with the one or more ancillary intermediate parts. For example, a washer or coating could be disposed between the two components.

Cover plate 124 is non-rotatably connected to cover plate 122, for example by fasteners 132, and includes radially outwardly extending protrusions 134 defining indentations 136. Protrusions 134 extend radially outwardly in radially outer direction RD1, orthogonal to axis of rotation AR of torque converter 100, from body portion 138 of cover plate 124. In the example of FIG. 1, fasteners 132 are rivets.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Intermediate flange 126 is axially disposed between cover plate 122 and cover plate 124, in particular between cover plate 122 and output flange 130. Intermediate flange 126 includes axially extending protrusions 140 disposed in indentations 136. Axially extending protrusions 140 define indentations 142. Each indentation 142 is bounded in axial direction AD1 by surface segment 144 of intermediate flange 126. Each surface segment 144 contacts a radially outwardly extending protrusion 134, for example surface 146 of protrusion 134 facing in axial direction AD2, opposite direction AD1. Resilient element 128 urges surfaces 144 into contact with surfaces 146 of protrusions 134.

Intermediate flange 126 is rotatable, via springs 131, with respect to cover plate 122, cover plate 124, and output flange 130. As further described below: surfaces 144 are rotatable with respect to surfaces 146; and protrusions 140 are rotatable within indentations 136.

Intermediate flange 126 defines slots 148, In the example of FIG. 1, slots 148 are bound by continuous edges 150 of flange 126. Fasteners 132 pass through slots 148. Surfaces 152 of protrusions 140 define indentations 142 in rotational direction RTD1 around axis AR. Surfaces 154 of protrusions 140 define indentations 142 in rotational direction RTD2, opposite direction RTD1. Portions 156 of edges 150 define slots 148 in direction RTD1. Portions 158 of edges 150 define slots 148 in direction RTD2.

Figure 6:
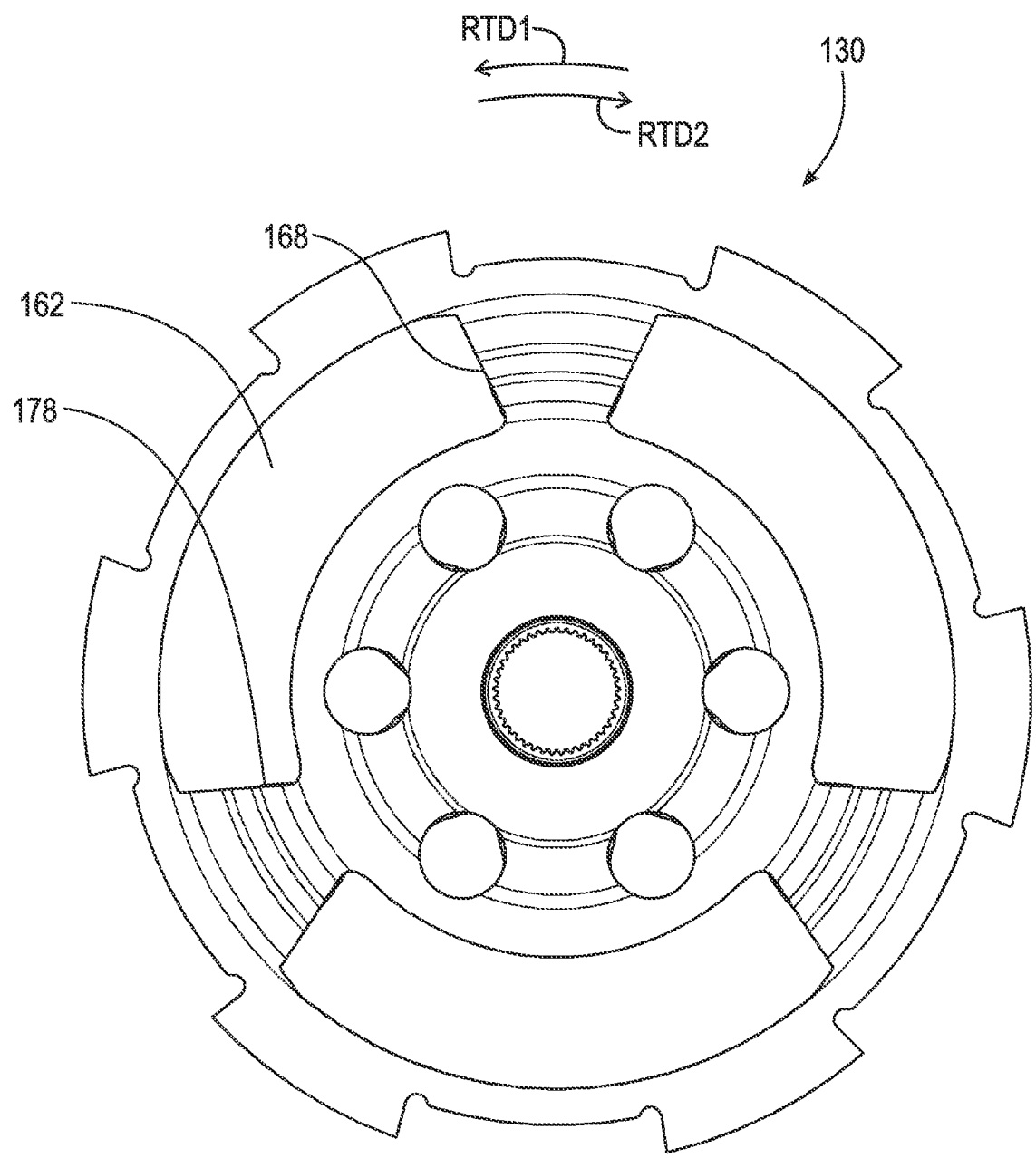
FIG. 6 is a back view of an output flange shown in FIG. 1.

FIG. 6 is a front view of output flange 130 shown in FIG. 1.

Figure 7:
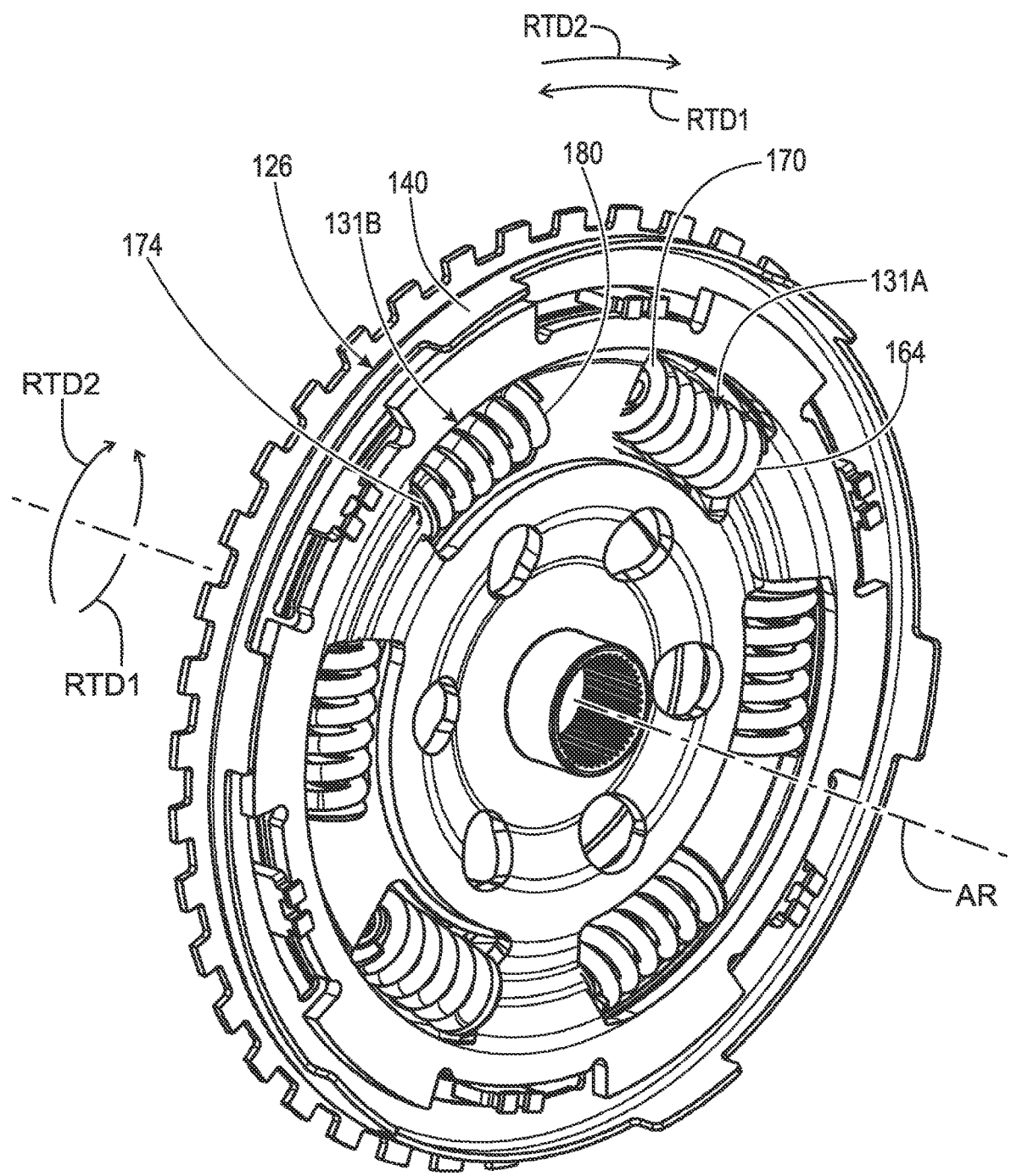
FIG. 7 is an isometric view of the vibration damper shown in FIG. 1 with a cover plate removed.

FIG. 7 is an isometric view of vibration damper 100 shown in FIG. 1 with cover plate 124 removed. The following should be viewed in light of FIGS. 1 through 7. Intermediate flange 126 defines slots 160 in which springs 131 are disposed, Output flange 130 defines slots 162 in which pairs of springs 131A and 131B are disposed. For springs 131A: ends 164 directly engage surfaces 166 of cover plate 124, and surfaces 168 defining slots 162 in direction RTD2; and ends 170 directly engage surfaces 172 defining slots 160 in direction RTD1. For springs 131B: ends 174 directly engage surfaces 176 of cover plate 124, and surfaces 178 defining slots 162 in direction RTD1; and ends 180 directly engage surfaces 182 defining slots 160 in direction RTD2. In the discussion above and in the discussion that follows, capital letters are used to designate a specific component from a group of components otherwise designated by a three-digit reference character. For example, springs 131A and 131B are specific examples among springs 131.

In the example of FIG. 1, torque converter 100 includes lock-up clutch 184 with axially displaceable piston plate 186 and clutch plate 188 non-rotatably connected to cover plate 122, for example by meshing with radially outwardly extending protrusions 190 of cover plate 122. Protrusions 134 include surfaces 188 bounding indentations 136 in direction RTD1, and surfaces 190 bounding indentations 136 in direction RTD2.

Figure 8:
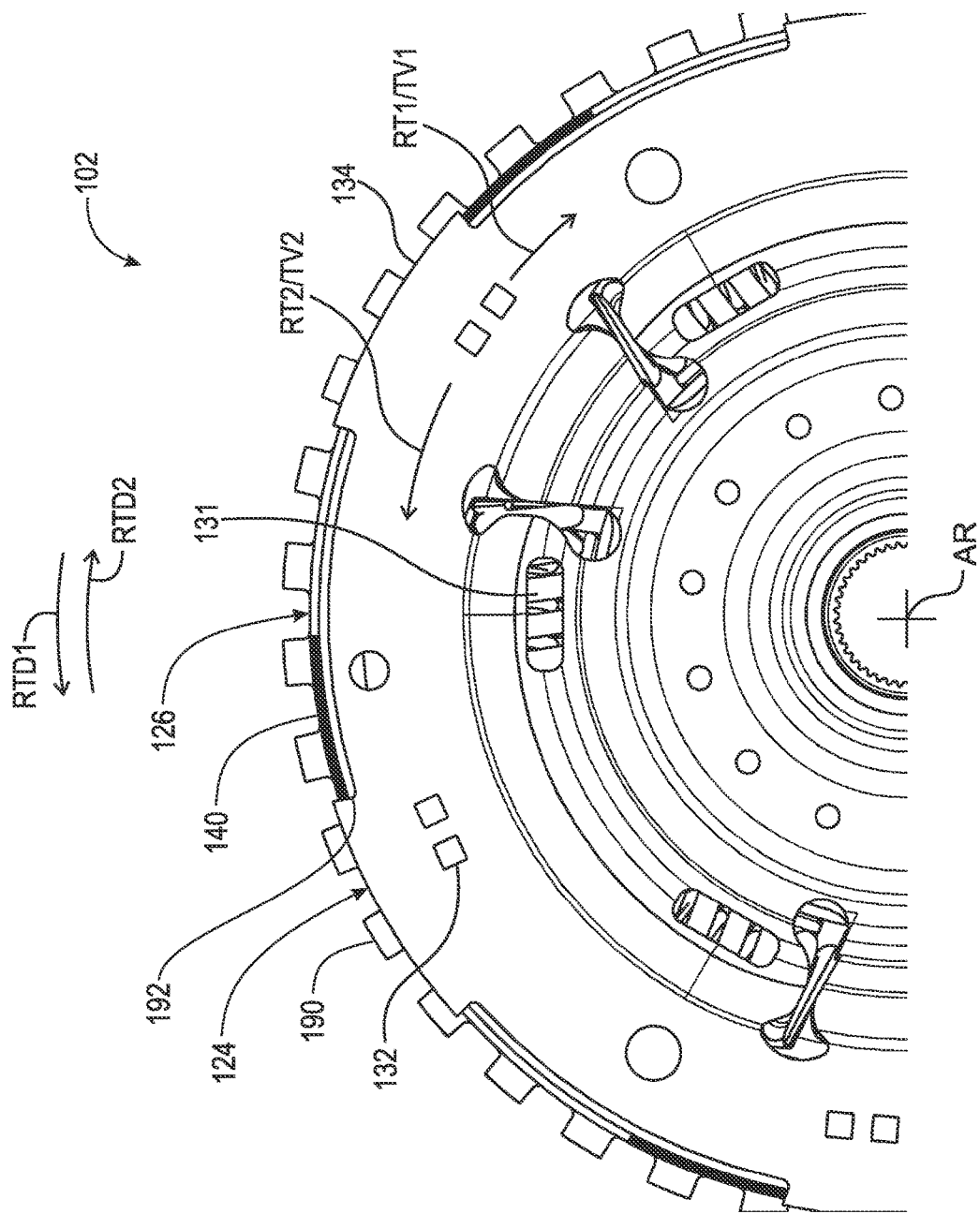
FIG. 8 is a partial back view of the vibration damper shown in FIG. 1 in a drive mode, with the intermediate flange and cover plate in contact.

FIG. 8 is a partial back view of vibration damper 100 shown in FIG. 1 in a drive mode, with intermediate flange 126 and cover plate 124 in contact. The following should be viewed in light of FIGS. 1 through 8. As is known in the art, in the drive mode of torque converter 100, cover 104 receives rotational torque RT1, for example in direction RTD1, and cover 104 transmits torque RT1 to output flange 130 via damper 102. In a torque converter sub-mode of the drive mode, clutch 184 is open and torque RT1 is transmitted to damper 102 via turbine shell 116 non-rotatably connected to cover plate 124, In a lock-up sub-mode of the drive mode, clutch 184 is closed and torque RT1 is transmitted to damper 102 via clutch 184 and clutch plate 188. It is understood that torque multiplication occurs in the torque converter mode. However, to simplify the discussion that follows, it is assumed that the magnitude of torque RT1 received by damper 102 is the same for both sub-modes.

In the drive mode, and for a magnitude of rotational torque RT1 in direction RTD1 and less than threshold value TV1: cover plate 124 transmits torque RT1 to flange 126 via springs 131A; and flange 126 transmits torque RT1 to flange 130 via springs 131B. Springs 131 can be uncompressed or partially compressed.

In the drive mode, and for a magnitude of rotational torque RT1 greater than or equal to threshold value TV1: cover plate 124 rotates, with respect to flange 126, in direction RTD1, and compresses springs 131A until surfaces 154 of protrusions 140 contact surfaces 192, defining indentations 136 in direction RTD2, preventing further rotation of cover plate 124, with respect to flange 126, in direction RTD1 and further compression of and possible damage to springs 131A. Cover plate 124 transmits torque RT1 directly to flange 126, bypassing springs 131A. Fasteners 132 do not contact portions 156, preventing damage to fasteners 132.

Figure 9:
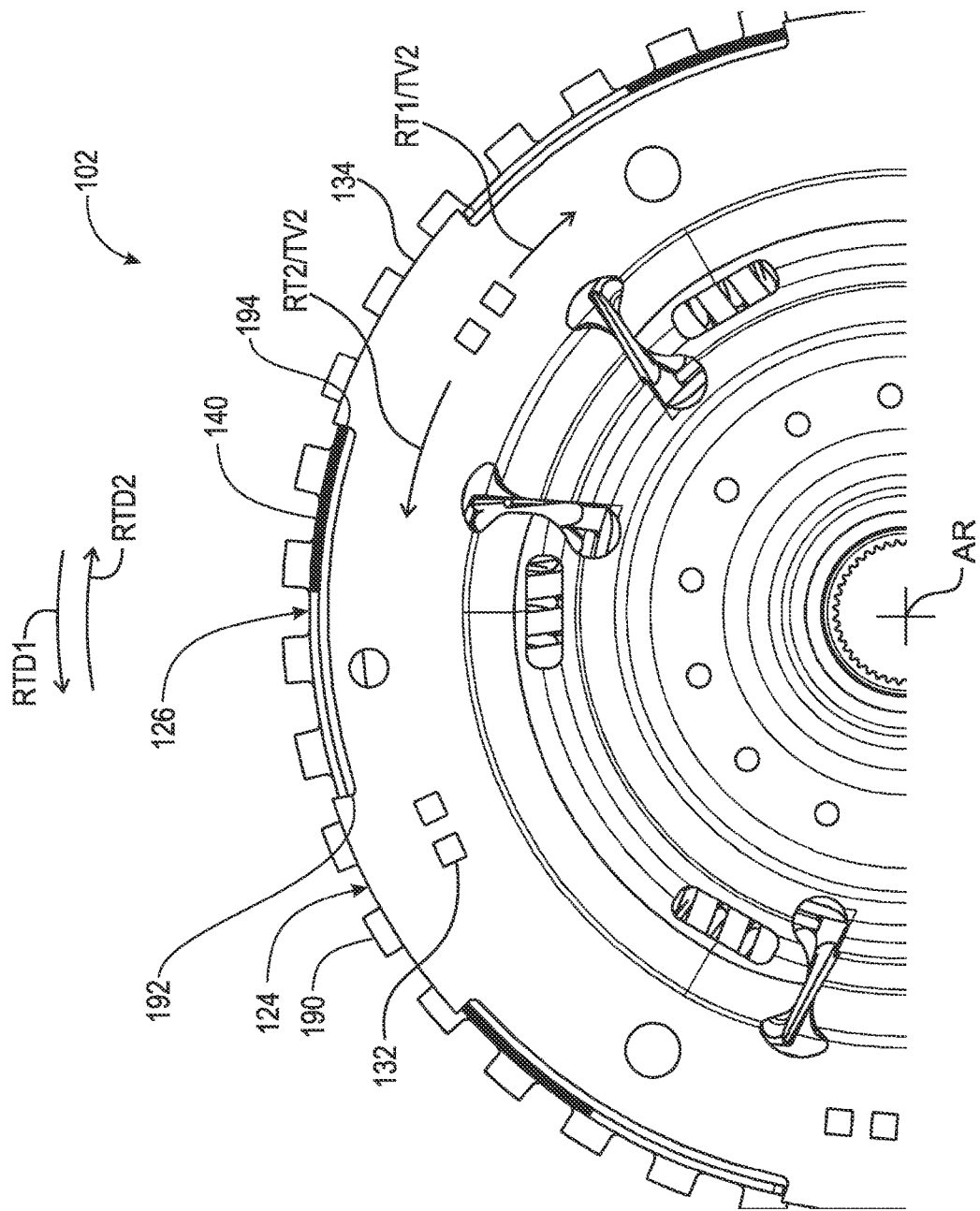
FIG. 9 is a partial back view of the vibration damper shown in FIG. 1 in a coast mode, with the intermediate flange and cover plate in contact; and, FIG. 10 is a partial back view of the vibration damper shown in FIG. 1 in the drive mode or in the coast mode, with the intermediate flange and cover plate not in contact.

FIG. 9 is a partial back view of damper 102 shown in FIG. 1 in a coast mode with intermediate flange 126 and cover plate 124 in contact. In the coast mode of torque converter 100, output flange 130 receives rotational torque RT2, in direction RTD2 from shaft TIS. In the coast mode, and for a magnitude of rotational torque RT2 less than threshold value TV2: flange 130 transmits torque RT2 to flange 126 via springs 131B; and flange 126 transmits torque RT2 to cover plate 124 via springs 131A. Springs 131 can be uncompressed or partially compressed.

In the coast mode, and for a magnitude of rotational torque RT2 greater than or equal to threshold value TV2: intermediate flange 126 rotates, with respect to cover plate 124, in direction RTD2, and compresses springs 131A until surfaces 152 of protrusions 140 contact surfaces 192, defining indentations 136 in direction RTD1, preventing further rotation of flange 126, with respect to cover plate 124, in direction RTD2 and further compression of and possible damage to springs 131A. Flange 126 transmits torque RT2 directly to cover plate 124, bypassing springs 131A. Fasteners 132 do not contact portions 158, preventing damage to fasteners 132.

Figure 10:
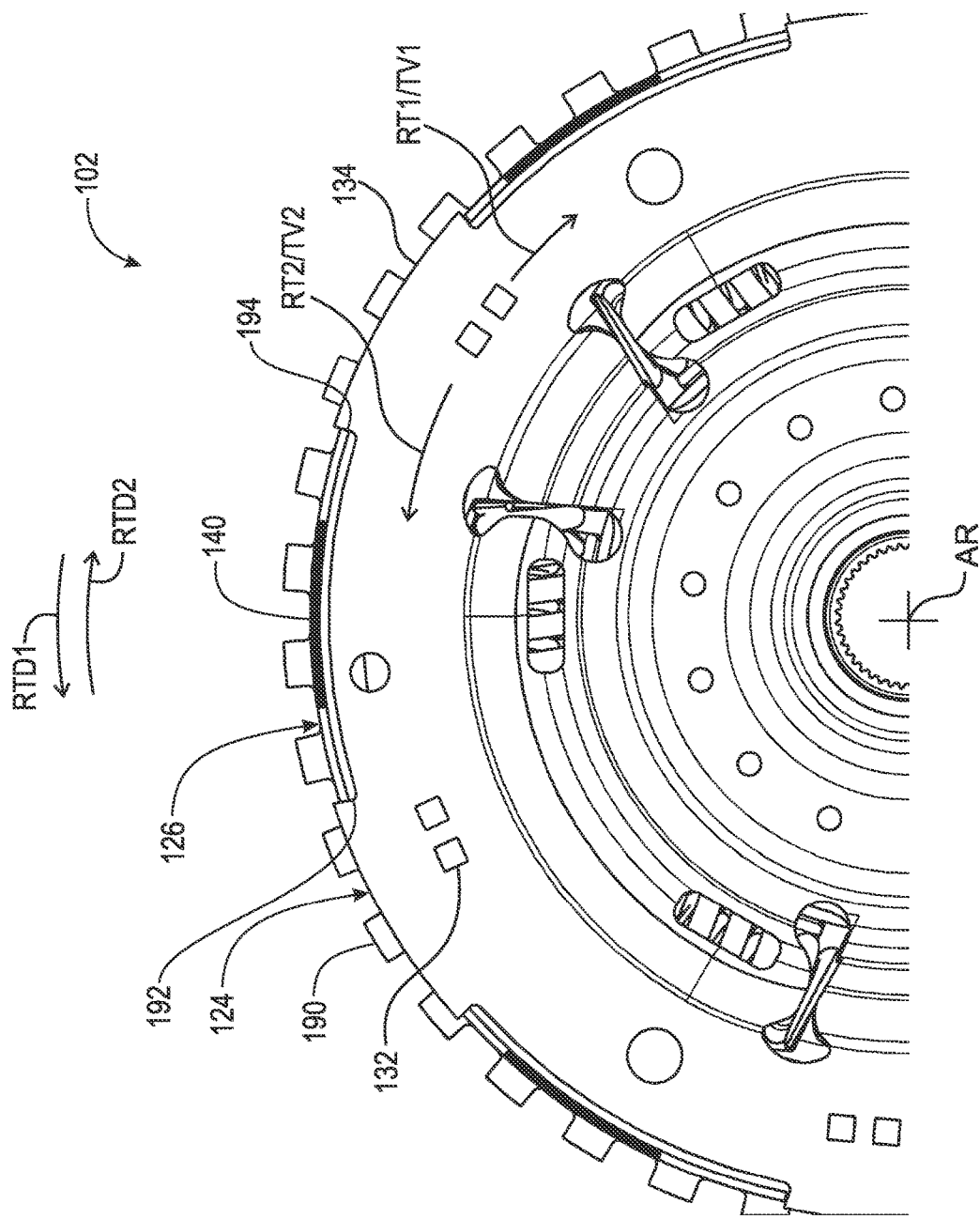

FIG. 10 is a partial back view of vibration damper 100 shown in FIG. 1 in either the drive mode or the coast mode with intermediate flange 126 and cover plate 124 free of contact. In the drive mode and for a magnitude of torque RT1 below threshold value TV1: some or all of springs 131 may be partially compressed, causing relative rotation among cover plate 124, flange 126 and/or flange 130, or springs 131 may be uncompressed by torque RT1; protrusions 140 are free of contact with protrusions 134; and fasteners 132 are free of contact with portions 156.

In the coast mode and for a magnitude of torque RT2 below threshold value TV2: some or all of springs 131 may be partially compressed, causing relative rotation among cover plate 124, flange 126 and/or flange 130, or springs 131 may be uncompressed by torque RT1; protrusions 140 are free of contact with protrusions 134; and fasteners 132 are free of contact with portions 158.

Protrusions 140 include surfaces 196 facing in radially inward direction RD1, and cover plate 124 includes surface segments 198 defining indentations 136 in radially outer direction RD1. The interface of surfaces 196 with segments 198 radially centers flange 126 to cover plate 124.

The following should be viewed in light of FIGS. 1 through 10. The following describes a method of operating a torque converter in a drive mode, the torque converter including a cover, an impeller, a turbine in fluid communication with the impeller, a stator including at least one stator blade axially disposed between the turbine and the impeller, a lock-up clutch, and a vibration damper including a first cover plate, a second cover plate non-rotatably connected to the first cover plate with a fastener and including a plurality of radially outwardly extending protrusions defining a first plurality of indentations, an intermediate flange axially disposed between the first cover plate and the second cover plate and including a plurality of axially extending protrusions disposed in the first plurality of indentations and defining a second plurality of indentations, an output flange, and pairs of springs engaged with the first cover plate, the second cover plate, the intermediate flange, and the output flange, the intermediate flange further including a slot through which the fastener passes.

A first step rotates, in a rotational direction and with a rotational torque having a magnitude less than a threshold value, the cover, the first cover plate, and the second cover plate. A second step transmits, via the springs, the torque from the second cover plate to the intermediate flange. A third step increases the magnitude of the rotational torque to be greater than or equal to the threshold value. A fourth step compresses one spring of each pair of springs between the second cover plate and the intermediate flange. A fifth step rotates the second cover plate, with respect to the intermediate flange, in the rotational direction. A sixth step contacts, with the plurality of axially extending protrusions, the plurality of radially outwardly extending protrusions. A seventh step blocks further compression of the one spring. An eighth step transmits the rotational torque directly from the second cover plate to the intermediate flange, bypassing the one spring. A ninth step displaces, in the rotational direction, the fastener through a slot in the intermediate flange without contacting a portion of the intermediate flange defining the slot in the rotational direction.

The following should be viewed in light of FIGS. 1 through 10. The following describes a method of operating a torque converter in a coast mode, the torque converter including a cover, an impeller, a turbine in fluid communication with the impeller, a stator including at least one stator blade axially disposed between the turbine and the impeller, a lock-up clutch, and a vibration damper including a first cover plate, a second cover plate non-rotatably connected to the first cover plate with a fastener and including a plurality of radially outwardly extending protrusions defining a first plurality of indentations, an intermediate flange axially disposed between the first cover plate and the second cover plate and including a plurality of axially extending protrusions disposed in the first plurality of indentations and defining a second plurality of indentations, an output flange, and pairs of springs engaged with the first cover plate, the second cover plate, the intermediate flange, and the output flange, the intermediate flange further including a slot through which the fastener passes.

A first step rotates, in a rotational direction and with a rotational torque having a magnitude less than a threshold value, the output flange. A second step transmits, via the springs, the torque from the output flange to the intermediate flange. A third step transmits, via the springs, the torque from the intermediate flange to the second cover plate. A fourth step increases the magnitude of the rotational torque to be greater than or equal to the threshold value. A fifth step compresses one spring of each pair of springs between the intermediate flange and the second cover plate. A sixth step rotates the intermediate flange, with respect to the second cover plate, in the rotational direction. A seventh step contacts, with the plurality of axially extending protrusions, the plurality of radially outwardly extending protrusions. An eighth step blocks further compression of the one spring. A ninth step transmits the rotational torque directly from the intermediate flange to second cover plate, bypassing the one spring. A tenth step displaces, in the rotational direction, the intermediate flange such that the fastener does not contact a portion of the intermediate flange defining the slot in the rotational direction.

The following should be viewed in light of FIGS. 1 through 10. The following describes a method of operating a torque converter including a cover, an impeller, a turbine in fluid communication with the impeller, a stator including at least one stator blade axially disposed between the turbine and the impeller, and a vibration damper including a first cover plate, a second cover plate non-rotatably connected to the first cover plate with a fastener and including radially outwardly extending protrusions, an intermediate flange axially disposed between the first cover plate and the second cover plate and including a axially extending protrusions, an output flange, a resilient element directly engaged with the first cover plate and the intermediate flange, and springs directly engaged with the first cover plate, the second cover plate, the intermediate flange, and the output flange.

A first step urges, with the resilient element, the axially extending protrusions into contact with the radially outwardly extending protrusions. A second step rotates, with a rotational torque, the cover, the first cover plate, and the second cover plate in a first rotational direction. A third step compresses one spring of each pair of springs between the second cover plate and the intermediate flange. A fourth step rotates, in the first rotational direction, the second cover plate with respect to the intermediate flange. A fifth step drags, in the first rotational direction, the axially extending protrusions across the radially extending protrusions, while maintaining contact between the axially extending protrusions and the radially extending protrusions.

A sixth step rotates, with a rotational torque, the output flange, the intermediate flange, the first cover plate, and the second cover plate in a second rotational direction, opposite the first rotational direction. A seventh step compresses one spring of each pair of springs between the intermediate flange and second cover plate. An eighth step rotates, in the second rotational direction, the intermediate flange with respect to second cover plate. A ninth step drags, in the second rotational direction, the radially extending protrusions across the axially extending protrusion, while maintaining contact between the axially extending protrusions and the radially extending protrusions.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
RD1 radially outer direction
RD2 radially inner direction
RTD1 rotational direction
RTD2 rotational direction
RT1 rotational torque
RT2 rotational torque
TIS transmission input shaft
TV1 threshold value
TV2 threshold value
100 torque converter
102 vibration damper
104 cover
106 impeller
108 turbine
110 stator
112 impeller shell
114 impeller blade
116 turbine shell
118 turbine blade
120 stator blade
122 cover plate
124 cover plate
126 intermediate flange
128 resilient element
130 output flange
131 spring
131A spring
131B spring
132 fastener
134 radially outwardly extending protrusion
136 indentation
138 body portion, plate 124
140 axially extending protrusion
142 indentation
144 surface segment, intermediate flange
146 surface, protrusion 134
148 slot
150 edge, slot 148
152 surface, axial protrusion
154 surface, axial protrusion
156 portion, edge 150
158 portion, edge 150
160 slot, intermediate flange
162 slot, output flange
164 end, spring
166 surface, cover plate
168 surface, output flange
170 end, spring
172 surface, intermediate flange
174 end, spring
176 surface, cover plate
178 surface, output flange
180 end, spring
182 surface, intermediate flange
184 lock-up clutch
186 piston plate
188 clutch plate
190 protrusion, cover plate 122
192 surface, radial protrusion
194 surface, radial protrusion
196 surface, protrusion 140
198 surface segment, cover plate

The invention claimed is:

1. A vibration damper for a torque converter, comprising:
a first cover plate arranged to receive, from a lock-up clutch, a first rotational torque in a first rotational direction;
a second cover plate non-rotatably connected to the first cover plate and including a plurality of radially outwardly extending protrusions defining a first plurality of indentations;
an intermediate flange:
axially disposed between the first cover plate and the second cover plate; and,
including a plurality of axially extending protrusions disposed in the first plurality of indentations, the axially extending protrusions having a greater axial length than an axial thickness of the intermediate flange; and,
a plurality of springs directly engaged with the first cover plate, the second cover plate, and the intermediate flange.

2. The vibration damper of claim 1, wherein the plurality of axially extending protrusions is rotatable within the first plurality of indentations.

3. The vibration damper of claim 1, wherein:
each radially outwardly extending protrusion includes a surface facing in a second rotational direction, opposite the first rotational direction; and,
in a drive mode of the vibration damper, each axially extending protrusion, included in the plurality of axially extending protrusions, is configured to be in contact with a respective surface.

4. The vibration damper of claim 3, further comprising:
a fastener non-rotatably connecting the first cover plate to the second cover plate, wherein:
the intermediate flange includes an edge defining a slot;
the edge includes a portion defining the slot in the first rotational direction;
the fastener passes through the slot; and,
in the drive mode, the fastener is free of contact with the portion of the edge.

5. The vibration damper of claim 1, wherein:
each radially outwardly extending protrusion includes a surface facing in the first rotational direction; and,
in a coast mode of the vibration damper, each axially extending protrusion, included in the plurality of axially extending protrusions, is configured to be in contact with a respective surface.

6. The vibration damper of claim 5, further comprising:
a fastener non-rotatably connecting the first cover plate to the second cover plate, wherein:
the intermediate flange includes an edge defining a slot;
the edge includes a portion defining the slot in a second rotational direction, opposite the first rotational direction;
the fastener passes through the slot; and,
in the coast mode, the fastener is free of contact with the portion of the edge.

7. The vibration damper of claim 1, further comprising:
a resilient element directly engaged with the first cover plate and the intermediate flange, wherein:
the plurality of axially extending protrusions define a second plurality of indentations;
each indentation included in the second plurality of indentations is bounded in a first axial direction, parallel to an axis of rotation of the torque converter, by a respective surface of the intermediate flange; and,
the resilient element urges each respective surface into contact with a respective radially outwardly extending protrusion included in the plurality of radially outwardly extending protrusions.

8. The vibration damper of claim 1, further comprising:
an output flange defining a slot, arranged to non-rotatable connect to an input shaft of a transmission, and directly engaged with the plurality of springs; and,
a fastener non-rotatably connecting the first cover plate to the second cover plate, and passing through the slot.

9. A vibration damper for a torque converter, comprising:
a first cover plate;
a second cover plate non-rotatably connected to the first cover plate;
an intermediate flange axially disposed between the first cover plate and the second cover plate;
a plurality of springs directly engaged with the first cover plate, the second cover plate, and the intermediate flange;
a resilient element:
directly engaged with the first cover plate and the intermediate flange; and,
urging the intermediate flange in a first axial direction, parallel to an axis of rotation of the vibration damper, away from the first cover plate and into contact with the second cover plate; and
an output flange positioned axially between the intermediate flange and the second cover plate.

10. The vibration damper of claim 9, wherein: the second cover plate includes a plurality of radially outwardly extending protrusions;
the intermediate flange includes a plurality of axially extending protrusions defining a plurality of indentations;
each indentation included in the plurality of indentations is bounded in a second axial direction, opposite the first axial direction, by a respective surface of the intermediate flange; and,
the resilient element urges each respective surface of the intermediate flange into contact with a respective radially outwardly extending protrusion included in the plurality of radially outwardly extending protrusions.

11. The vibration damper of claim 10, wherein each respective surface of the intermediate flange is rotatable with respect to the respective radially outwardly extending protrusion included in the plurality of radially outwardly extending protrusions.

12. The vibration damper of claim 9, wherein:
the second cover plate includes a plurality of radially outwardly extending protrusions defining a plurality of indentations; and,
the intermediate flange includes a plurality of axially extending protrusions disposed in the plurality of indentations.

13. The vibration damper of claim 12, further comprising:
a fastener non-rotatably connecting the first cover plate to the second cover plate, wherein:
the intermediate flange includes an edge defining a slot in the intermediate flange;
the edge includes:
a first portion defining the slot in a first rotational direction, opposite the first rotational direction;
a second portion defining the slot in a second rotational direction, opposite the first rotational direction;
the fastener passes through the slot; and,
in a plurality of configurations of the vibration damper:
the plurality of axially extending protrusion is in contact with the plurality of radially outwardly extending protrusions; and,
the fastener is free of contact with the first portion of the edge and with the second portion of the edge.

14. The vibration damper of claim 13, wherein: each radially outwardly extending protrusion includes:
a first surface facing in the first rotational direction; and,
a second surface facing in the second rotational direction;
in a first configuration, included in the plurality of configurations, each axially extending protrusion is in contact with a respective first surface; and,
in a second configuration, included in the plurality of configurations, each axially extending protrusion is in contact with a respective second surface.

15. A torque converter, comprising:
a cover;
an impeller including:
an impeller shell connected to the cover; and,
at least one impeller blade;
a turbine in fluid communication with the impeller and including:
a turbine shell; and,
at least one turbine blade;
a stator including at least one stator blade axially disposed between the turbine and the impeller; and, a vibration damper including:
a first cover plate;
a second cover plate non-rotatably connected to the first cover plate;
an intermediate flange axially disposed between the first cover plate and the second cover plate;
a plurality of springs directly engaged with the first cover plate, the second cover plate, and the intermediate flange;
a resilient element:
directly engaged with the first cover plate and the intermediate flange; and,
urging the intermediate flange in a first axial direction, parallel to an axis of rotation of the torque converter, away from the first cover plate and into contact with the second cover plate; and
an output flange positioned axially between the intermediate flange and the second cover plate.

16. The torque converter of claim 15, wherein:
the second cover plate includes a plurality of radially outwardly extending protrusions;
the intermediate flange includes a plurality of axially extending protrusions defining a plurality of indentations;
each indentation included in the plurality of indentations is bounded in a second axial direction, opposite the first axial direction, by a respective surface of the intermediate flange; and,
the resilient element urges each respective surface of the intermediate flange into contact with a respective radially outwardly extending protrusion included in the plurality of radially outwardly extending protrusions.

17. The torque converter of claim 16, wherein the intermediate flange is rotatable with respect to the second cover plate.

18. The torque converter of claim 15, wherein:
the second cover plate includes a plurality of radially outwardly extending protrusions defining a plurality of indentations; and,
the intermediate flange includes a plurality of axially extending protrusions disposed in the plurality of indentations.

19. The torque converter of claim 18, further comprising:
a fastener non-rotatably connecting the first cover plate to the second cover plate, wherein:
each radially outwardly extending protrusion includes a surface facing in a first rotational direction;
the intermediate flange includes an edge defining a slot;
the edge includes a portion defining the slot in a second rotational direction, opposite the first rotational direction;
the fastener passes through the slot; and,
in a drive mode of the vibration damper:
the cover is arranged to receive a rotational torque in a second rotational direction, opposite the first rotational direction;
the cover is arranged to transmit the rotational torque to the intermediate flange;
each axially extending protrusion is arranged to contact a respective surface; and,
the fastener is free of contact with the portion.

20. The torque converter of claim 18, further comprising:
a fastener non-rotatably connecting the first cover plate to the second cover plate; and,
the output flange is engaged with the plurality of springs and arranged to non-rotatably connect to a transmission input shaft, wherein:
each radially outwardly extending protrusion includes a surface facing in a first rotational direction;
the intermediate flange includes an edge defining a slot;
the edge includes a portion defining the slot in a second rotational direction, opposite the first rotational direction;
the fastener passes through the slot; and,
in a coast mode of the vibration damper:
the output flange is arranged to receive a rotational torque in a second rotational direction, opposite the first rotational direction;
the output flange is arranged to transmit the rotational torque to the intermediate flange;
each axially extending protrusion is arranged to contact a respective surface; and,
the fastener is free of contact with the portion.

* * * * *